(12) United States Patent
Lee

(10) Patent No.: US 10,218,676 B2
(45) Date of Patent: *Feb. 26, 2019

(54) FLEXIBLE NETWORK SECURITY SYSTEM AND METHOD FOR PERMITTING TRUSTED PROCESS

(71) Applicant: CAP Co., Ltd., Ahnsung-si, Gyunggi-do (KR)

(72) Inventor: Dong-Hyuk Lee, Seoul (KR)

(73) Assignee: CAP CO., LTD., Ahsung-si, Gyunggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,504

(22) Filed: Jun. 21, 2013

(65) Prior Publication Data

US 2013/0283366 A1   Oct. 24, 2013

Related U.S. Application Data

(63) Continuation of application No. 10/582,127, filed as application No. PCT/KR2004/003456 on Dec. 27, 2004, now Pat. No. 8,544,078.

(30) Foreign Application Priority Data

Dec. 31, 2003   (KR) .......................... 10-2003-0101775

(51) Int. Cl.
    *H04L 29/06*   (2006.01)
(52) U.S. Cl.
    CPC ................. *H04L 63/0236* (2013.01)
(58) Field of Classification Search
    CPC .................................................. H04L 63/0236

(Continued)

(56) References Cited

U.S. PATENT DOCUMENTS 5,987,611 A * 11/1999 Freund .............................. 726/4
6,141,686 A * 10/2000 Jackowski et al. ........... 709/224

(Continued)

FOREIGN PATENT DOCUMENTS

JP   2004054488 A   2/2004
KR   20010090014 A   10/2001

(Continued)

OTHER PUBLICATIONS

Joseph Crowley (Introduction to Tiny Personal Firewall for Home Computers. Jul. 22, 2002).*

(Continued)

*Primary Examiner* — Oleg Korsak
(74) *Attorney, Agent, or Firm* — Nath, Goldberg & Meyer; Gregory Kang; Stanley Protigal

(57) ABSTRACT

A flexible network security system and method permit a trusted process through a firewall. The system includes a port monitoring unit for extracting information about a server port being used through a network communication program, an internal permitted program storage configured to store a list of programs permitted by the firewall, and a firewall flexible device configured to add the network communication program to the list of programs by extracting information about the network communication program and to automatically store the extracted information about the server port in an internal port storage if the network communication program tries to listen to the server port. The firewall flexible device is further configured to determine whether a port of a packet of inbound traffic matches the server port and to allow the packet of inbound traffic if the port matches the server port.

21 Claims, 7 Drawing Sheets

(58) Field of Classification Search
USPC .......................................... 726/11.29, 11, 29
See application file for complete search history.

(56) References Cited

U.S. PATENT DOCUMENTS

| | | | |
|---|---|---|---|
| 6,182,146 B1* | 1/2001 | Graham-Cumming, Jr. | ................ H04L 29/12009 370/389 |
| 6,182,228 B1* | 1/2001 | Boden | ..................... H04L 45/00 709/227 |
| 6,687,732 B1* | 2/2004 | Bector | .............. H04L 29/12009 709/200 |
| 6,728,885 B1 | 4/2004 | Taylor et al. | |
| 6,868,450 B1* | 3/2005 | Lucovsky | ..................... 709/229 |
| 7,054,944 B2* | 5/2006 | Tang et al. | ..................... 709/229 |
| 7,062,552 B2 | 6/2006 | Jung | |
| 7,146,638 B2 | 12/2006 | Malcolm | |
| 7,328,451 B2 | 2/2008 | Aaron | |
| 7,340,770 B2 | 3/2008 | Freund | |
| 8,544,078 B2 | 9/2013 | Lee | |
| 2003/0115327 A1 | 6/2003 | Kokado et al. | |
| 2003/0149887 A1 | 8/2003 | Yadav | |
| 2003/0149888 A1 | 8/2003 | Yadav | |

FOREIGN PATENT DOCUMENTS

| | | |
|---|---|---|
| KR | 20020001190 A | 1/2002 |
| KR | 20020086434 A | 11/2002 |

OTHER PUBLICATIONS

Reece Arnott (A Review of Current Firewall Technologies. Aug. 21, 2002).*
Vadim V. Smirnov (Firewall for Windows 9x/NT/2000, publicly available at least from Aug. 5, 2002).*
Crowley, Introduction to Tiny Personal Firewall for Home Computers. Jul. 22, 2002, retrieved from https://web.archive.org/web/20020404101833/http://www.giac.org/practical/Joe_Crowley_GSEC.doc on Jun. 13, 2014.*
User's Guide Tiny Personal Firewall 3.0, Printed on Apr. 17, 2002, 98 pages.*
Gregg Keizer, "Tiny Personal Firewall 3.0 review", (Reviewed: Jun. 7, 2002 / Updated: Oct. 10, 2002, retrieved from CNET, 5 pages).*
"Up-to-date Information about personal firewall preventing cracker, worm and spyware", by Daka Yoshi Amada, Nikkei Business publication Inc., Japan, Nikkei Network No. 32, Nov. 22, 2002, p. 76-83.
International Preliminary Report on Patentability; PCT/KR2004/003456; dated Apr. 14, 2006.
International Search Report; PCT/KR2004/003456; dated Apr. 11, 2005.
Written Opinion of the International Preliminary Examining Authority (PCT Rule 66); PCT/KR2004/003456; dated Jan. 10, 2006.
Written Opinion of the International Searching Authority (PCT Rule 43bis.I); PCT/KR2004/003456; dated Apr. 11, 2005.
Paper 001 in Case No. IPR2015-01856 (U.S. Pat. No. 8,544,078), Transmittal Letter for Petitioner McAfee, Inc. Inter Partes Review of U.S. Pat. No. 8,544,078 (method and computer-recordable device claims 7-11, 13-15, 21, and 23-25) dated Sep. 2, 2015.
Paper 011 in Case No. IPR2015-01856 (U.S. Pat. No. 8,544,078), Patent Owner CAP Co., Ltd.'s Preliminary Response Under 37 C.F.R. § 42.107 dated Dec. 11, 2015.
Paper 013 in Case No. IPR2015-01856 (U.S. Pat. No. 8,544,078), Decision entered Mar. 8, 2016.
Paper 014 in Case No. IPR2015-01856 (U.S. Pat. No. 8,544,078), Scheduling Order entered Mar. 8, 2016.
Paper 018 in Case No. IPR2015-01856 (U.S. Pat. No. 8,544,078), Patent Owner CAP Co., Ltd.'s Response Under 37 C.F.R. § 42.120 dated May 20, 2016.
Paper 021 in Case No. IPR2015-01856 (U.S. Pat. No. 8,544,078), Petitioner's Reply to Patent Owner's Response dated Jul. 29, 2016.
Paper 027 in Case No. IPR2015-01856 (U.S. Pat. No. 8,544,078), Petitioner's Updated Exhibit List dated Oct. 28, 2016.
Paper 029 in Case No. IPR2015-01856 (U.S. Pat. No. 8,544,078), Patent Owner's Updated Exhibit List dated Oct. 28, 2016.
Paper 030 in Case No. IPR2015-01856 (U.S. Pat. No. 8,544,078), Record of Oral Hearing dated Feb. 2, 2017.
Paper 031 in Case No. IPR2015-01856 (U.S. Pat. No. 8,544,078), Final Written Decision entered Mar. 6, 2017.
Paper 002 in Case No. IPR2015-01876 (U.S. Pat. No. 8,544,078), Transmittal Letter for Petitioner McAfee, Inc. Inter Partes Review of U.S. Pat. No. 8,544,078 (system claims 1-5, 16 and 18-20) dated Sep. 4, 2015.
Paper 010 in Case No. IPR2015-01876 (U.S. Pat. No. 8,544,078), Patent Owner CAP Co., Ltd.'s Preliminary Response Under 37 C.F.R. § 42.107 dated Dec. 11, 2015.
Paper 012 in Case No. IPR2015-01876 (U.S. Pat. No. 8,544,078), Decision entered Mar. 8, 2016.
Paper 013 in Case No. IPR2015-01876 (U.S. Pat. No. 8,544,078), Scheduling Order entered Mar. 8, 2016.
Paper 017 in Case No. IPR2015-01876 (U.S. Pat. No. 8,544,078), Patent Owner CAP Co., Ltd.'s Response Under 37 C.F.R. § 42.120 dated May 20, 2016.
Paper 020 in Case No. IPR2015-01876 (U.S. Pat. No. 8,544,078), Petitioner's Reply to Patent Owner's Response dated Jul. 29, 2016.
Paper 025 in Case No. IPR2015-01876 (U.S. Pat. No. 8,544,078), Petitioner's Updated Exhibit List dated Oct. 28, 2016.
Paper 027 in Case No. IPR2015-01876 (U.S. Pat. No. 8,544,078), Patent Owner's Updated Exhibit List dated Oct. 28, 2016.
Paper 028 in Case No. IPR2015-01876 (U.S. Pat. No. 8,544,078), Record of Oral Hearing dated Feb. 2, 2017.
Paper 029 in Case No. IPR2015-01876 (U.S. Pat. No. 8,544,078), Final Written Decision entered Mar. 6, 2017.
U.S. District Court, Washington Western District (Seattle), *CAP v. Microsoft*, Case No. 2:14-cv-01899, Civil Docket Sheet.
U.S. District Court, Washington Western District (Seattle), *CAP v. Microsoft*, Case No. 2:14-cv-01899, Document 1, Complaint, jury trial demanded, against Microsoft Corporation ( Filing fee $ 400, receipt No. 0971-8744831.). Filed byCAP Co., Ltd. (Attachments: # 1 Exhibit A to Complaint, # 2 Exhibit B to Complaint, # 3 Exhibit C to Complaint, # 4 Civil Cover Sheet) (Wecker, Bruce) (Filed on Jul. 3, 2014) Modified on Jul. 3, 2014 (kc, Court Staff). [Transferred from cand on Dec. 16, 2014.] (Entered: Jul. 3, 2014).
U.S. District Court, Washington Western District (Seattle), *CAP v. Microsoft*, Case No. 2:14-cv-01899, Document 17, Motion to Dismiss Pursuant to Federal Rules of Civil Procedure 12(b)(6); Memorandum of Points and Authorities in Support of Motion to Dismiss filed by Microsoft Corporation. Motion Hearing set for Dec. 3, 2014 09:30 AM in Courtroom 11, 19th Floor, San Francisco before Hon. James Donato. Responses due by Nov. 7, 2014. Replies due by Nov. 14, 2014. (Attachments: # 1 Proposed Order) (Filed on Oct. 24, 2014) [Transferred from cand on Dec. 16, 2014.] (Entered Oct. 24, 2014).
U.S. District Court, Washington Western District (Seattle), *CAP v. Microsoft*, Case No. 2:14-cv-01899, Document 33, Amended Complaint against Microsoft Corporation. Filed byCAP Co., Ltd.. Attachments: # 1 Exhibit A, # 2 Exhibit B, # 3 Exhibit C)(Wecker, Bruce) (Filed on Nov. 17, 2014). Replies due by Dec. 23, 2014. (Attachments: # 1 Proposed Order) (Wilson, Erica) (Filed on Dec. 2, 2014) [Transferred from cand on Dec. 16, 2014.] (Entered Dec. 2, 2014).
U.S. District Court, Washington Western District (Seattle), *CAP v. Microsoft*, Case No. 2:14-cv-01899, Document 42, Motion to Dismiss Re: Amended Complaint Pursuant to Fed. R. Civ. P . 12(b)(6); Memorandum of Points and Authorities in Support Thereof filed by Microsoft Corporation. Motion Hearing set for Jan. 7, 2015 09:30 AM in Courtroom 11, 19th Floor, San Francisco before Hon. James Donato. Responses due by Dec. 16, 2014.
U.S. District Court, Washington Western District (Seattle), *CAP v. Microsoft*, Case No. 2:14-cv-01899, Document 63, Response, by Plaintiff CAP Co., Ltd., to 42 Defendant's motion to dismiss the amended complaint . (Mann, Philip) Modified on Jan. 6, 2015 (MD). (Entered: Jan. 5, 2015).

(56) References Cited

OTHER PUBLICATIONS

U.S. District Court, Washington Western District (Seattle), *CAP* v. *Microsoft*, Case No. 2:14-cv-01899, Document 71, Judgment by Court—The Court Has Ordered That as to the indirect infringement claims, Plaintiffs amended complaint fails to allege sufficient facts or elements to state a claim for either inducement or contributory infringement. Regarding the direct infringement cause of action, the Court finds that Plaintiffs pleading fail to satisfy either element of the claim. Having found that further amendment of these claims would be futile, this lawsuit DISMISSED with prejudice in its entirety. (MD) (Entered: Apr. 4, 2015).
U.S. District Court, Washington Western District (Seattle), *CAP* v. *Microsoft*, Case No. 2:14-cv-01899, Document 72, Motion for Reconsideration re 70 Order, Terminate Motions,, Plaintiff CAP Co., Ltd.'s Motion to Reconsider by Plaintiff CAP Co., Ltd.. (Wecker, Bruce) (Entered: Apr. 17, 2015).
U.S. District Court, Washington Western District (Seattle), *CAP* v. *Microsoft*, Case No. 2:14-cv-01899, Document 74, Response, by Defendant Microsoft Corporation, to 72 Motion for Reconsideration re 70 Order, Terminate Motions,, Plaintiff CAP Co., Ltd.'s Motion to Reconsider. (Dunwoody, Stuart) (Entered: May 1, 2015).
U.S. District Court, Washington Western District (Seattle), *CAP* v. *Microsoft*, Case No. 2:14-cv-01899, Document 76, Order—It is Ordered that Plaintiff's 72 Motion for Reconsideration is Partially Granted: the Court's previous order (Dkt. No. 70) is Withdrawn, and an amended order will issue reinstating Plaintiff's lawsuit solely on the basis of its claims for direct infringement, by Judge Marsha J. Pechman.(MD) (Entered: May 8, 2015).
U.S. District Court, Washington Western District (Seattle), *CAP* v. *Microsoft*, Case No. 2:14-cv-01899, Document 77, Amended Order on Motion to Dismiss by Judge Marsha J. Pechman. (MD) (Entered: May 8, 2015).
U.S. District Court, Washington Western District (Seattle), *CAP* v. *Microsoft*, Case No. 2:14-cv-01899, Document 78, Answer to 33 Amended Complaint with Jury Demand by Microsoft Corporation. (Dunwoody, Stuart) (Entered: May 22, 2015).
U.S. District Court, Washington Western District (Seattle), *CAP* v. *Microsoft*, Case No. 2:14-cv-01899, Document 83, Order granting 82 Stipulated Motion to stay proceedings. Case stayed. The parties will file a report on the status of the case every 180 days until the stay is lifted; the next report is due Dec. 18, 2015, by Judge Marsha J. Pechman. (MD) (Entered: Jun. 18, 2015).
U.S. District Court, Washington Western District (Seattle), *CAP* v. *Microsoft*, Case No. 2:14-cv-01899, Document 84, Joint Status Report signed by all parties (Wecker, Bruce) (Entered: Dec. 17, 2015).
U.S. District Court, California Northern District (San Francisco), *CAP* v. *Symantec*, Case No. 3:14-cv-05071, Civil Docket Sheet.
U.S. District Court, California Northern District (San Francisco), *CAP* v. *Symantec*, Case No. 3:14-cv-05071, Document 1, Complaint for Patent Infringement against Symantec Corporation ( Filing fee $ 400, receipt No. 0971-9079724.). Filed by CAP Co., Ltd.. (Attachments: # 1 Civil Cover Sheet, # 2 Exhibit A, # 3 Exhibit B, # 4 Exhibit C)(Wecker, Bruce) (Filed on Nov. 17, 2014) (Entered: Nov. 17, 2014).
U.S. District Court, California Northern District (San Francisco), *CAP* v. *Symantec*, Case No. 3:14-cv-05071, Document 12, Motion to Dismiss for Failure to State a Claim filed by Symantec Corporation. Motion Hearing set for Mar. 4, 2015 10:00 AM in Courtroom 11, 19th Floor, San Francisco before Hon. James Donato. Responses due by Jan. 26, 2015. Replies due by Feb. 2, 2015. (Attachments: # 1 Proposed Order Granting Defendant Symantec Corporation's Motion to Dismiss for Failure to State a Claim)(Shanberg, Stefani) (Filed on Jan. 12, 2015) (Entered: Jan. 12, 2015).
U.S. District Court, California Northern District (San Francisco), *CAP* v. *Symantec*, Case No. 3:14-cv-05071, Document 13, Response (re 12 Motion to Dismiss for Failure to State a Claim ) filed by CAP Co., Ltd.. (Wecker, Bruce) (Filed on Jan. 26, 2015) (Entered: Jan. 26, 2015).
U.S. District Court, California Northern District (San Francisco), *CAP* v. *Symantec*, Case No. 3:14-cv-05071, Document 17, Reply (re 12 Motion to Dismiss for Failure to State a Claim ) filed by Symantec Corporation. (Shanberg, Stefani) (Filed on Feb. 2, 2015) (Entered: Feb. 2, 2015).
U.S. District Court, California Northern District (San Francisco), *CAP* v. *Symantec*, Case No. 3:14-cv-05071, Document 31, Amended Complaint against Symantec Corporation. Filed by CAP Co., Ltd.. (Attachments: # 1 Exhibit A, # 2 Exhibit B)(Wecker, Bruce) (Filed on Jul. 10, 2015) (Entered: Jul. 10, 2015).
U.S. District Court, California Northern District (San Francisco), *CAP* v. *Symantec*, Case No. 3:14-cv-05071, Document 33, Claim Construction Statement Joint Claim Construction and Prehearing Statement Pursuant to Patent Local Rule 4-3 filed by CAP Co., Ltd.. (Attachments: # 1 Exhibit A, # 2 Exhibit B)(Wecker, Bruce) (Filed on Jul. 17, 2015) (Entered: Jul. 17, 2015).
U.S. District Court, California Northern District (San Francisco), *CAP* v. *Symantec*, Case No. 3:14-cv-05071, Document 36, Answer to Amended Complaint with Jury Demand, Counterclaim against CAP Co., Ltd. by Symantec Corporation. (Shanberg, Stefani) (Filed on Jul. 27, 2015) (Entered: Jul. 27, 2015).
U.S. District Court, California Northern District (San Francisco), *CAP* v. *Symantec*, Case No. 3:14-cv-05071, Document 37, Answer to Counterclaim Plaintiff CAP Co., Ltd.'s Answer to Defendant Symantec Corporation's Counterclaims by CAP Co., Ltd.. (Wecker, Bruce) (Filed on Aug. 14, 2015) (Entered: Aug. 14, 2015).
U.S. District Court, California Northern District (San Francisco), *CAP* v. *Symantec*, Case No. 3:14-cv-05071, Document 39, Claim Construction Statement Plaintiff's Opening Claim Construction Brief filed by CAP Co., Ltd.. (Attachments: # 1 Declaration of Bruce Wecker, # 2 Exhibit A (Part 1) to Wecker Decl., # 3 Exhibit A (Part 2) to Wecker Decl., # 4 Exhibit A (Part 3) to Wecker Decl., # 5 Exhibit B (Part 1) to Wecker Decl., # 6 Exhibit B (Part 2) to Wecker Decl., # 7 Exhibit B (Part 3) to Wecker Decl., # 8 Exhibit B (Part 4) to Wecker Decl., # 9 Exhibit C to Wecker Decl., # 10 Declaration of David Bernstein, # 11 Exhibit A to Bernstein Decl.) (Wecker, Bruce) (Filed on Sep. 18, 2015) (Entered: Sep. 18, 2015).
U.S. District Court, California Northern District (San Francisco), *CAP* v. *Symantec*, Case No. 3:14-cv-05071, Document 41, Order by Hon. James Donato granting 40 Stipulation. All deadlines are vacated and proceedings stayed pending the outcome of petitions currently before the U.S. Patent Trial and Appeal Board. The parties will submit a joint status report to the Court within two weeks of any decision to institute IPR or any other final decision by the Board. (jdlc3S, Court Staff) (Filed on Oct. 5, 2015) (Entered: Oct. 6, 2015).
U.S. District Court, California Northern District (San Francisco), *CAP* v. *McAfee*, Case No. 3:14-cv-05068, Civil Docket Sheet.
U.S. District Court, California Northern District (San Francisco), *CAP* v. *McAfee*, Case No. 3:14-cv-05068, Document 1, Complaint for Patent Infringement against McAfee, Inc. ( Filing fee $ 400, receipt No. 0971-9079489.). Filed byCAP Co., Ltd.. (Attachments: # 1 Civil Cover Sheet)(Wecker, Bruce) (Filed on Nov. 17, 2014) (Entered: Nov. 17, 2014).
U.S. District Court, California Northern District (San Francisco), *CAP* v. *McAfee*, Case No. 3:14-cv-05068, Document 24, Motion to Dismiss Defendant McAfee, Inc.'s Notice of Motion and Motion to Dismiss Plaintiff's Complaint filed by McAfee, Inc.. Motion Hearing set for Mar. 4, 2015 10:00 AM in Courtroom 11, 19th Floor, San Francisco before Hon. James Donato. Responses due by Jan. 26, 2015. Replies due by Feb. 2, 2015. (Attachments: # 1 Proposed Order)(Valentine, James) (Filed on Jan. 12, 2015) (Entered: Jan. 12, 2015).
U.S. District Court, California Northern District (San Francisco), *CAP* v. *McAfee*, Case No. 3:14-cv-05068, Document 25, Response (re 24 Motion to Dismiss Defendant McAfee, Inc.'s Notice of Motion and Motion to Dismiss Plaintiff's Complaint ) filed byCAP Co., Ltd.. (Wecker, Bruce) (Filed on Jan. 26, 2015) (Entered: Jan. 26, 2015).
U.S. District Court, California Northern District (San Francisco), *CAP* v. *McAfee*, Case No. 3:14-cv-05068, Document 26, Reply (re 24 Motion to Dismiss Defendant McAfee, Inc.'s Notice of Motion and Motion to Dismiss Plaintiff's Complaint ) McAfee, Inc.'s Reply

(56) References Cited

OTHER PUBLICATIONS in Support of Motion to Dismiss Plaintiff's Complaint filed byMcAfee, Inc.. (Valentine, James) (Filed on Feb. 2, 2015) (Entered: Feb. 2, 2015).
U.S. District Court, California Northern District (San Francisco), *CAP* v. *McAfee*, Case No. 3:14-cv-05068, Document 48, Motion to Strike Defendant McAfee, Inc.'s Notice of Motion and Motion to Strike Plaintiff CAP Co. Ltd.'s Infringement Contentions filed by McAfee, Inc.. Motion Hearing set for Jun. 24, 2015 10:00 AM in Courtroom 11, 19th Floor, San Francisco before Hon. James Donato. Responses due by Jun. 3, 2015. Replies due by Jun. 10, 2015. (Attachments: # 1 Declaration James R Valentine, # 2 Exhibit A, # 3 Exhibit B, # 4 Exhibit C, # 5 Exhibit D, # 6 Exhibit E, # 7 Exhibit F, # 8 Exhibit G, # 9 Exhibit H, # 10 Exhibit I, # 11 Exhibit J, # 12 Exhibit K, # 13 Exhibit L, # 14 Proposed Order)(Valentine, James) (Filed on May 20, 2015) (Entered: May 20, 2015).
U.S. District Court, California Northern District (San Francisco), *CAP* v. *McAfee*, Case No. 3:14-cv-05068, Document 51, Response (re 48 Motion to Strike Defendant McAfee, Inc.'s Notice of Motion and Motion to Strike Plaintiff CAP Co. Ltd.'s Infringement Contentions ) Plaintiff CAP Co., Ltd.'s Opposition to Defendant McAfee, Inc.'s Motion to Strike Amended Infringement Contentions filed byCAP Co., Ltd.. (Attachments: # 1 Declaration of Bruce Wecker, # 2 Exhibit A, # 3 Exhibit B, # 4 Exhibit C, # 5 Exhibit D, # 6 Exhibit E, # 7 Exhibit F, # 8 Exhibit G, # 9 Exhibit H, # 10 Exhibit I, # 11 Exhibit J) (Wecker, Bruce) (Filed on Jun. 10, 2015) (Entered: Jun. 10, 2015).
U.S. District Court, California Northern District (San Francisco), *CAP* v. *McAfee*, Case No. 3:14-cv-05068, Document 52, Reply (re 48 Motion to Strike Defendant McAfee, Inc.'s Notice of Motion and Motion to Strike Plaintiff CAP Co. Ltd.'s Infringement Contentions ) McAfee, Inc.'s Reply in Support of Its Motion to Strike CAP Co., Ltd.'s Infringement Contentions filed byMcAfee, Inc.. (Attachments: # 1 Declaration James F. Valentine, # 2 Exhibit A, # 3 Exhibit B, # 4 Exhibit C, # 5 Exhibit D, # 6 Exhibit E, # 7 Exhibit F, # 16 Exhibit O, # 17 Exhibit P, # 18 Exhibit Q, # 19 Exhibit R, # 20 Exhibit S, # 21 Exhibit T, # 22 Exhibit U, # 23 Exhibit V)(Valentine, James) (Filed on Jun. 17, 2015) (Entered: Jun. 17, 2015).
U.S. District Court, California Northern District (San Francisco), *CAP* v. *McAfee*, Case No. 3:14-cv-05068, Document 59, Order by Hon. James Donato granting 24 Motion to Dismiss. (jdlc3S, Court Staff) (Filed on Jun. 26, 2015) (Entered: Jun. 26, 2015).
U.S. District Court, California Northern District (San Francisco), *CAP* v. *McAfee*, Case No. 3:14-cv-05068, Document 61, Motion for Reconsideration of the Court's Order Regarding Motion to Dismiss filed by McAfee, Inc.. (Valentine, James) (Filed on Jul. 7, 2015) (Entered: Jul. 7, 2015).
U.S. District Court, California Northern District (San Francisco), *CAP* v. *McAfee*, Case No. 3:14-cv-05068, Document 62, Amended Complaint against McAfee, Inc.. Filed byCAP Co., Ltd.. (Attachments: # 1 Exhibit A, # 2 Exhibit B) (Wecker, Bruce) (Filed on Jul. 10, 2015) (Entered: Jul. 10, 2015).
U.S. District Court, California Northern District (San Francisco), *CAP* v. *McAfee*, Case No. 3:14-cv-05068, Document 66, Claim Construction Statement Joint Claim Construction and Prehearing Statement Pursuant to Patent Local Rule 4-3 filed by CAP Co., Ltd.. (Attachments: # 1 Exhibit A, # 2 Exhibit B)(Wecker, Bruce) (Filed on Jul. 17, 2015) (Entered: Jul. 17, 2015).
U.S. District Court, California Northern District (San Francisco), *CAP* v. *McAfee*, Case No. 3:14-cv-05068, Document 68, Answer to Amended Complaint Defendant McAfee, Inc.'s Answer, Counterclaims and Jury Demand, Counterclaim against CAP Co., Ltd. byMcAfee, Inc.. (Valentine, James) (Filed on Jul. 24, 2015) (Entered: Jul. 24, 2015).
U.S. District Court, California Northern District (San Francisco), *CAP* v. *McAfee*, Case No. 3:14-cv-05068, Document 70, Answer to Counterclaim Plaintiff Cap Co., Ltd.'s Answer to Defendant McAfee, Inc.'s Counterclaims byCAP Co., Ltd.. (Wecker, Bruce) (Filed on Aug. 14, 2015) (Entered: Aug. 14, 2015).

U.S. District Court, California Northern District (San Francisco), *CAP* v. *McAfee*, Case No. 3:14-cv-05068, Document 73, Claim Construction Statement Plaintiff's Opening Claim Construction Brief filed by CAP Co., Ltd.. (Attachments: # 1 Declaration of Bruce Wecker, # 2 Exhibit A (Part 1) to Wecker Decl., # 3 Exhibit A (Part 2) to Wecker Decl., # 4 Exhibit A (Part 3) to Wecker Decl., # 5 Exhibit B (Part 1) to Wecker Decl., # 6 Exhibit B (Part 2) to Wecker Decl., # 7 Exhibit B (Part 3) to Wecker Decl., # 8 Exhibit B (Part 4) to Wecker Decl., # 9 Exhibit C, # 10 Declaration of David Bernstein, # 11 Exhibit A to Bernstein Decl.)(Wecker, Bruce) (Filed on Sep. 18, 2015) (Entered: Sep. 18, 2015).
U.S. District Court, California Northern District (San Francisco), *CAP* v. *McAfee*, Case No. 3:14-cv-05068, Document 76, Order by Hon. James Donato granting 75 Stipulation. All deadlines are vacated and proceedings stayed pending the outcome of petitions currently before the U.S. Patent Trial and Appeal Board. The parties will submit a joint status report to the Court within two weeks of any decision to institute IPR or any other final decision by the Board. (jdlc3S, Court Staff) (Filed on Oct. 5, 2015) (Entered: Oct. 5, 2015).
Exhibit 1001 in Case Nos. IPR2015-01856 and IPR2015-01876 (U.S. Pat. No. 8,544,078), U.S. Pat. No. 8,544,078 to Dong-Hyuk Lee.
Exhibit 1002 in Case Nos. IPR2015-01856 and IPR2015-01876 (U.S. Pat. No. 8,544,078), U.S. Pat. No. 7,062,552 to Satyendra Yadav.
Exhibit 1003 in Case Nos. IPR2015-01856 and IPR2015-01876 (U.S. Pat. No. 8,544,078), U.S. Pat. No. 5,987,611 to Gregor Freund.
Exhibit 1004 in Case Nos. IPR2015-01856 and IPR2015-01876 (U.S. Pat. No. 8,544,078), Declaration of Dr. Atul Prakash.
Exhibit 1005 in Case Nos. IPR2015-01856 and IPR2015-01876 (U.S. Pat. No. 8,544,078), Excerpts of File History of U.S. Pat. No. 8,544,078.
Exhibit 1006 in Case Nos. IPR2015-01856 and IPR2015-01876 (U.S. Pat. No. 8,544,078), USPTO Patent and Published Application Search Listings for FreundPatent.
Exhibit 1007 in Case Nos. IPR2015-01856 and IPR2015-01876 (U.S. Pat. No. 8,544,078), USPTO Patent and Published Application Search Listings for FreundPatent before Dec. 30, 2003.
Exhibit 1008 in Case Nos. IPR2015-01856 and IPR2015-01876 (U.S. Pat. No. 8,544,078), U.S. Pat. No. 7,328,451 filed on Jun. 30, 2003.
Exhibit 1009 in Case Nos. IPR2015-01856 and IPR2015-01876 (U.S. Pat. No. 8,544,078), U.S. Pat. No. 7,340,770 filed on May 14, 2003.
Exhibit 1010 in Case Nos. IPR2015-01856 and IPR2015-01876 (U.S. Pat. No. 8,544,078), Excerpts of Joint Claim Construction and Prehearing StatementPursuant to Patent Local Rule 4-3.
Exhibit 1011 in Case Nos. IPR2015-01856 and IPR2015-01876 (U.S. Pat. No. 8,544,078), Curriculum Vitae of Dr. Atul Prakash.
Exhibit 1012 in Case Nos. IPR2015-01856 and IPR2015-01876 (U.S. Pat. No. 8,544,078), W. Richard Stevens, Unix Network Programming, vol. 1, 2nd ed.(1998) ("Stevens").
Exhibit 1013 in Case Nos. IPR2015-01856 and IPR2015-01876 (U.S. Pat. No. 8,544,078), William R. Cheswick and Steven M. Bellovin, "Chapter 3: FirewallGateways," Firewalls and Internet Security, Addison-Wesley (1994) ("Cheswick").
Exhibit 1014 in Case Nos. IPR2015-01856 and IPR2015-01876 (U.S. Pat. No. 8,544,078), U.S. Patent Application Publication No. 2003/0149887 A1 ("Yadav'887").
Exhibit 1015 in Case Nos. IPR2015-01856 and IPR2015-01876 (U.S. Pat. No. 8,544,078), "TCPServerChannel," Microsoft .Net v. 1.1 documentation.
Exhibit 1016 in Case Nos. IPR2015-01856 and IPR2015-01876 (U.S. Pat. No. 8,544,078), "TCPChannel," Cornell University.
Exhibit 1017 in Case Nos. IPR2015-01856 and IPR2015-01876 (U.S. Pat. No. 8,544,078), "New program stops Windows 2000/NT/98 security weaknesses andTrojans for free," InfoWorld, Feb 7, 2000—Freund Cover.
Exhibit 1018 in Case Nos. IPR2015-01856 and IPR2015-01876 (U.S. Pat. No. 8,544,078), "Server Lockdown Locks Out End Users," Computerworld, Apr. 23, 2001.

(56) References Cited

OTHER PUBLICATIONS

Exhibit 1019 in Case Nos. IPR2015-01856 and IPR2015-01876 (U.S. Pat. No. 8,544,078), Excerpts from Teri Bidwell et al., Hack Proofing Your Identity in theInformation Age, Syngress Publishing (2002).
Exhibit 1020 in Case Nos. IPR2015-01856 and IPR2015-01876 (U.S. Pat. No. 8,544,078), Excerpts from Jones, Network Programming for Microsoft Windows,Microsoft Press (2nd ed., 2002).
Exhibit 1021 in Case Nos. IPR2015-01856 and IPR2015-01876 (U.S. Pat. No. 8,544,078), Excerpts from Windows Sockets: An Open Interface for NetworkProgramming under Microsoft Windows (v1.1, Jan. 20, 1993).
Exhibit 1022 in Case Nos. IPR2015-01856 and IPR2015-01876 (U.S. Pat. No. 8,544,078), Deposition of David Bernstein.
Exhibit 1023 in Case Nos. IPR2015-01856 and IPR2015-01876 (U.S. Pat. No. 8,544,078), Reply Declaration of Dr. Atul Prakash.
Exhibit 1024 in Case Nos. IPR2015-01856 and IPR2015-01876 (U.S. Pat. No. 8,544,078), Errata to Deposition of Dr. Atul Prakash.
Exhibit 1025 in Case Nos. IPR2015-01856 and IPR2015-01876 (U.S. Pat. No. 8,544,078), Petitioner's Demonstrative Exhibits.
Exhibit 2002 in Case Nos. IPR2015-01856 and IPR2015-01876 (U.S. Pat. No. 8,544,078), File History, U.S. Appl. No. 10/582,127.
Exhibit 2003 in Case Nos. IPR2015-01856 and IPR2015-01876 (U.S. Pat. No. 8,544,078), Case 3:14-cv-05071-JD (Document 33-2), Exhibit B to JointClaim Construction and Prehearing Statement.
Exhibit 2004 in Case Nos. IPR2015-01856 and IPR2015-01876 (U.S. Pat. No. 8,544,078), Deposition of Atul Prakash.
Exhibit 2005 in Case Nos. IPR2015-01856 and IPR2015-01876 (U.S. Pat. No. 8,544,078), Taylor et al. U.S. Pat. No. 6,728,885.
Exhibit 2006 in Case Nos. IPR2015-01856 and IPR2015-01876 (U.S. Pat. No. 8,544,078), Malcolm U.S. Pat. No. 7,146,638.
Exhibit 2007 in Case Nos. IPR2015-01856 and IPR2015-01876 (U.S. Pat. No. 8,544,078), Declaration of David Bernstein.
Exhibit 2008 in Case Nos. IPR2015-01856 and IPR2015-01876 (U.S. Pat. No. 8,544,078), Patent Owner's Demonstrative Exhibits.

\* cited by examiner

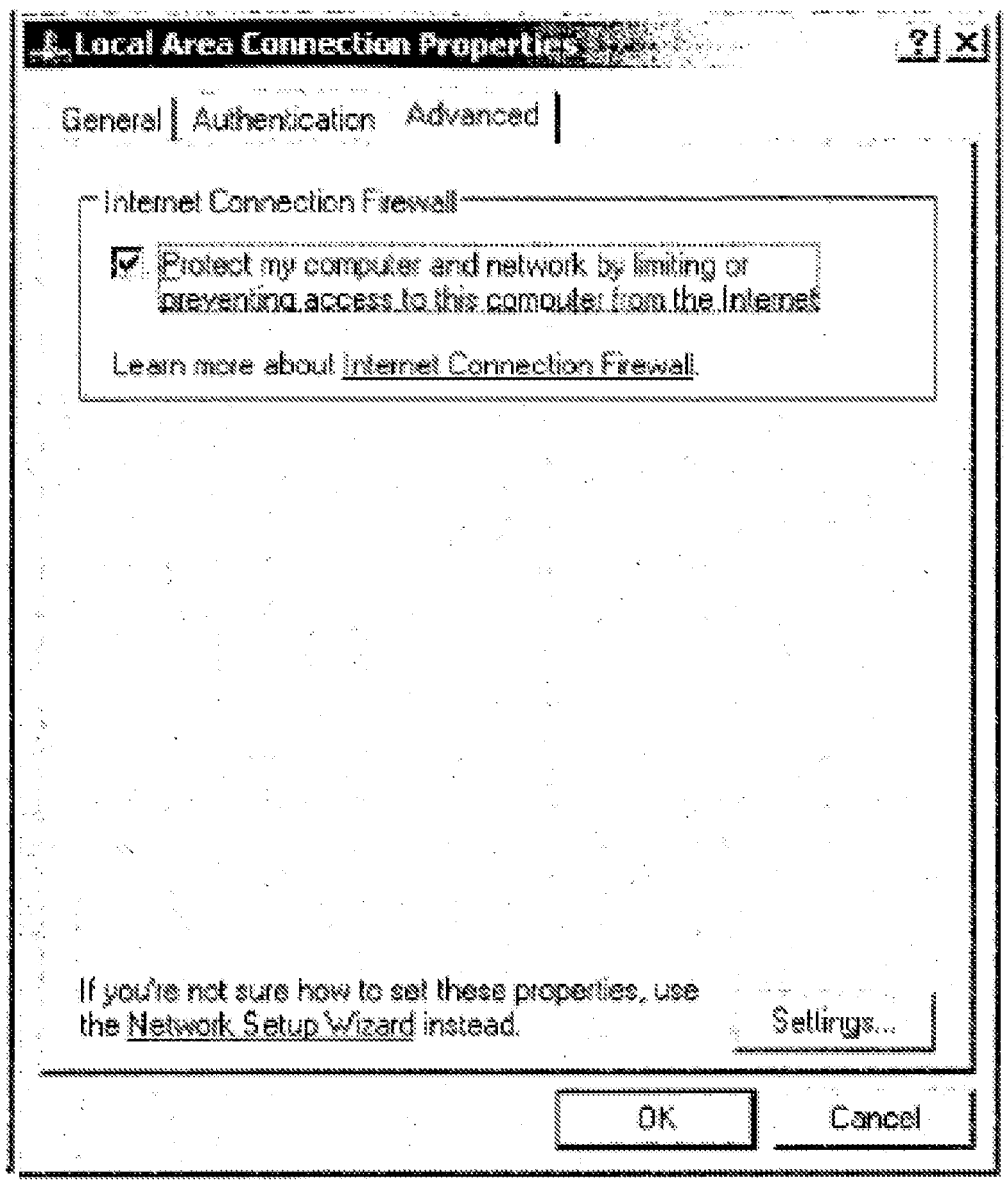
[Figure 1]
PRIOR ART

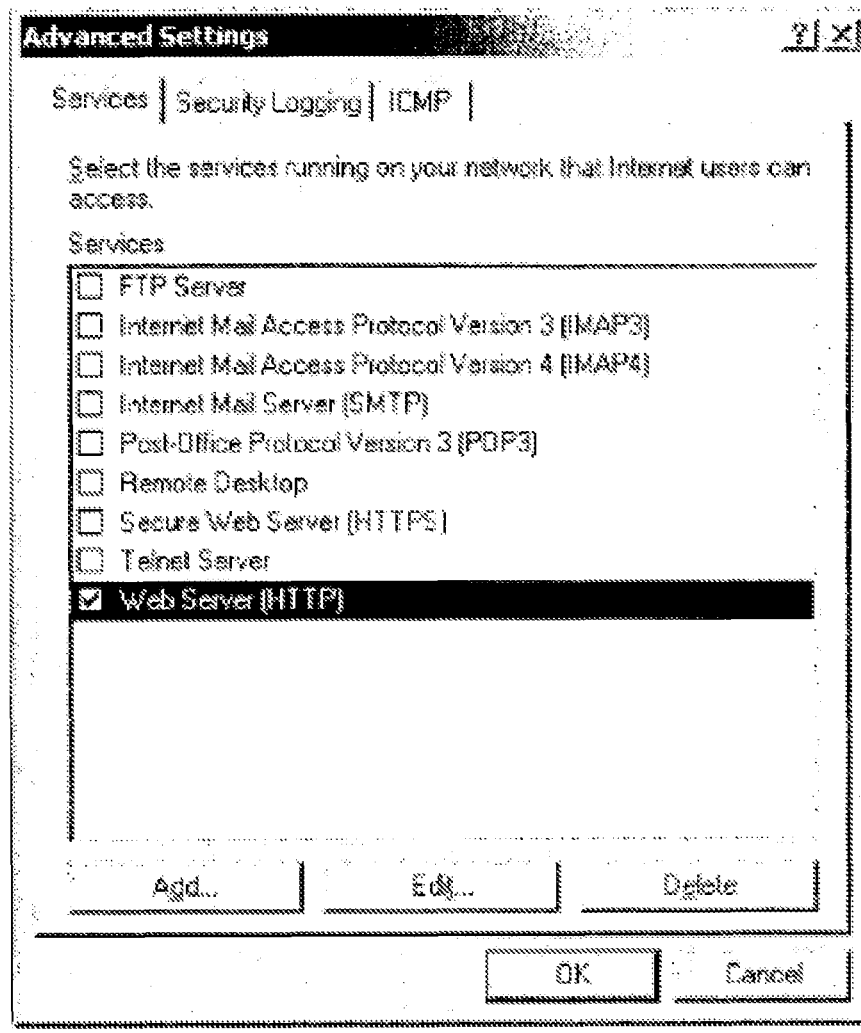
PRIOR ART

[Figure 3]
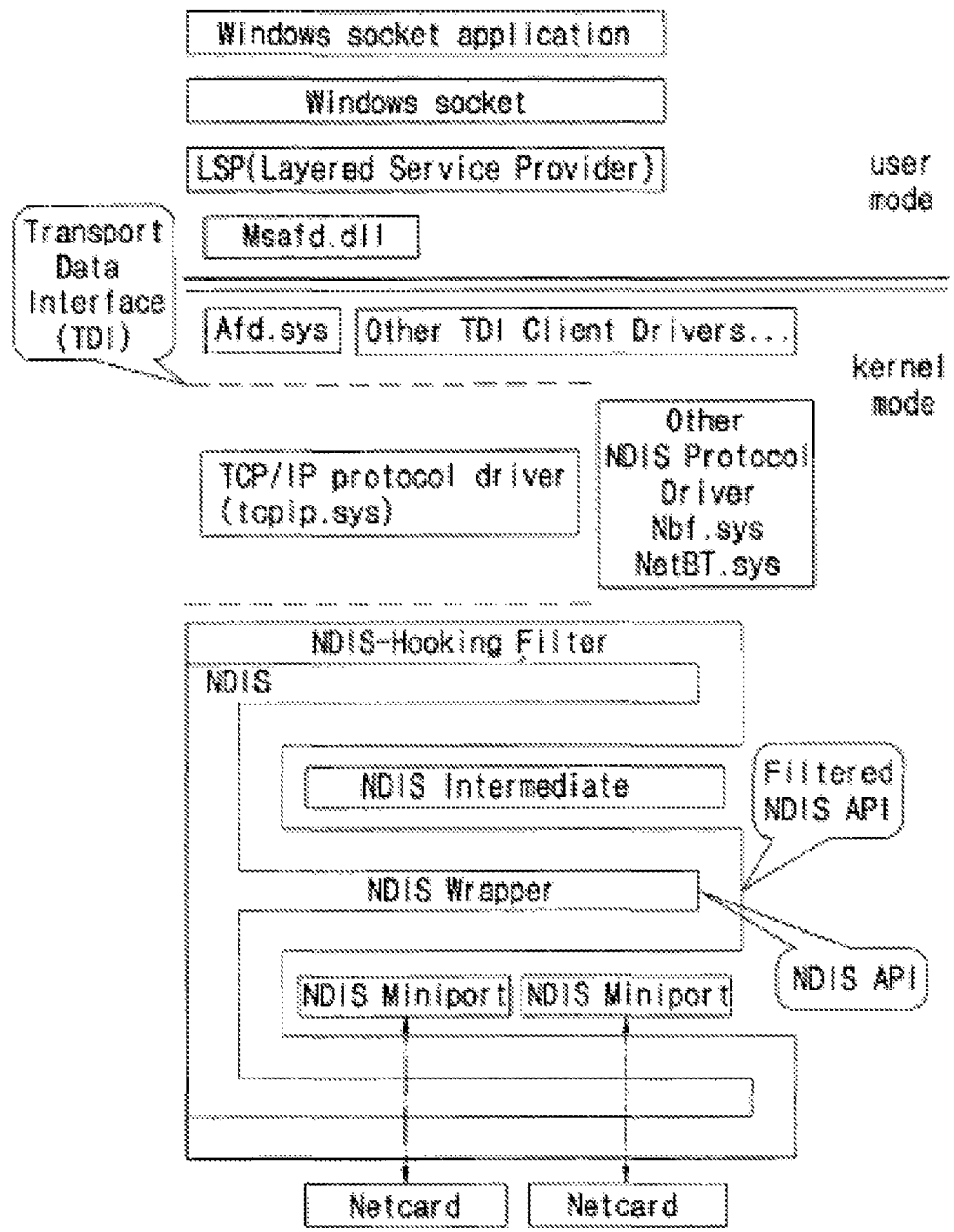
PRIOR ART

[Figure 4]
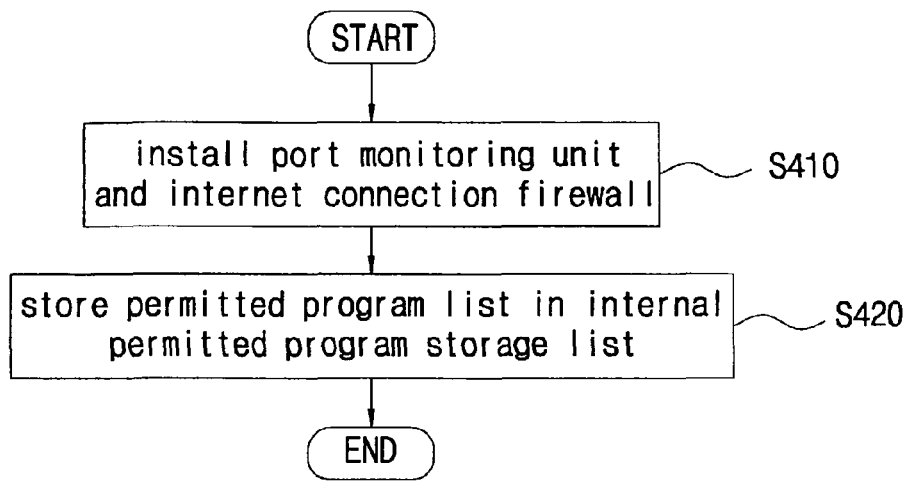
[Figure 5]
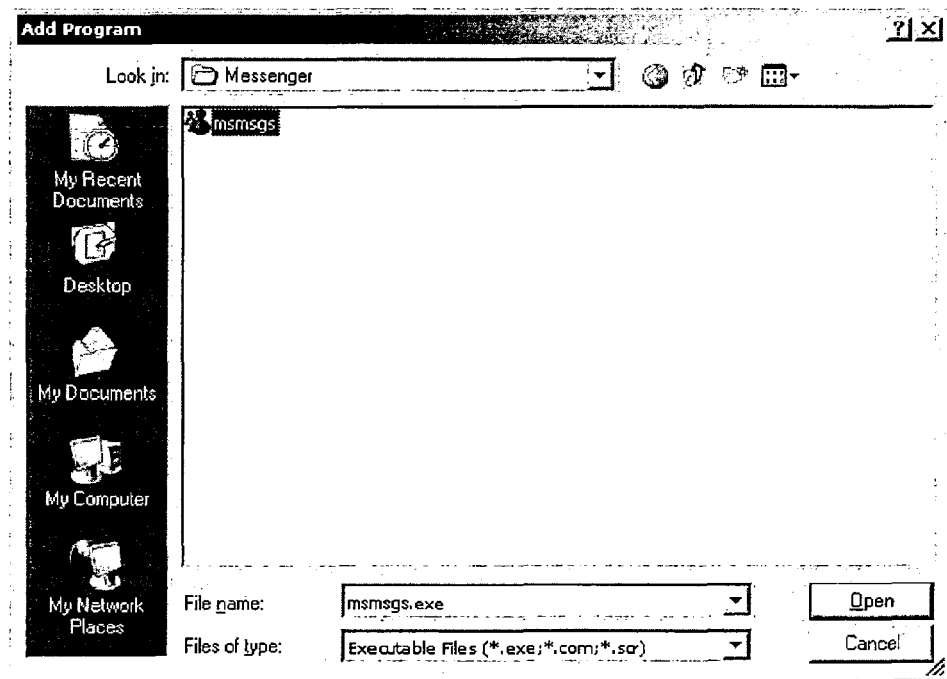

[Figure 6]
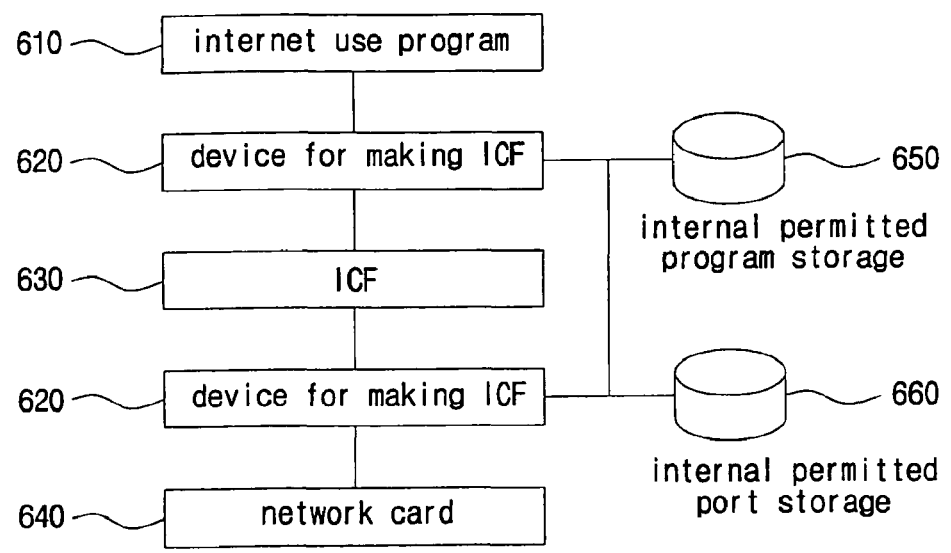

[Figure 7]
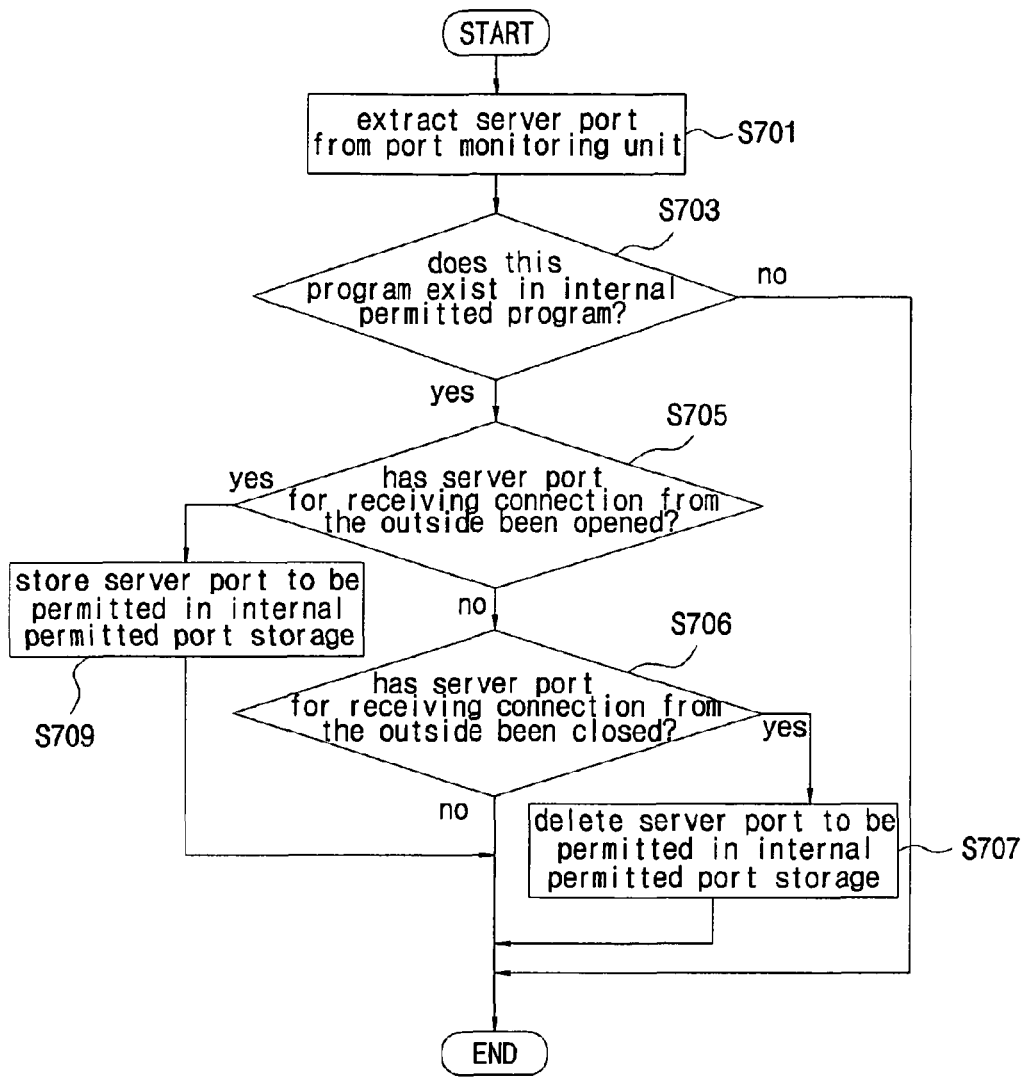

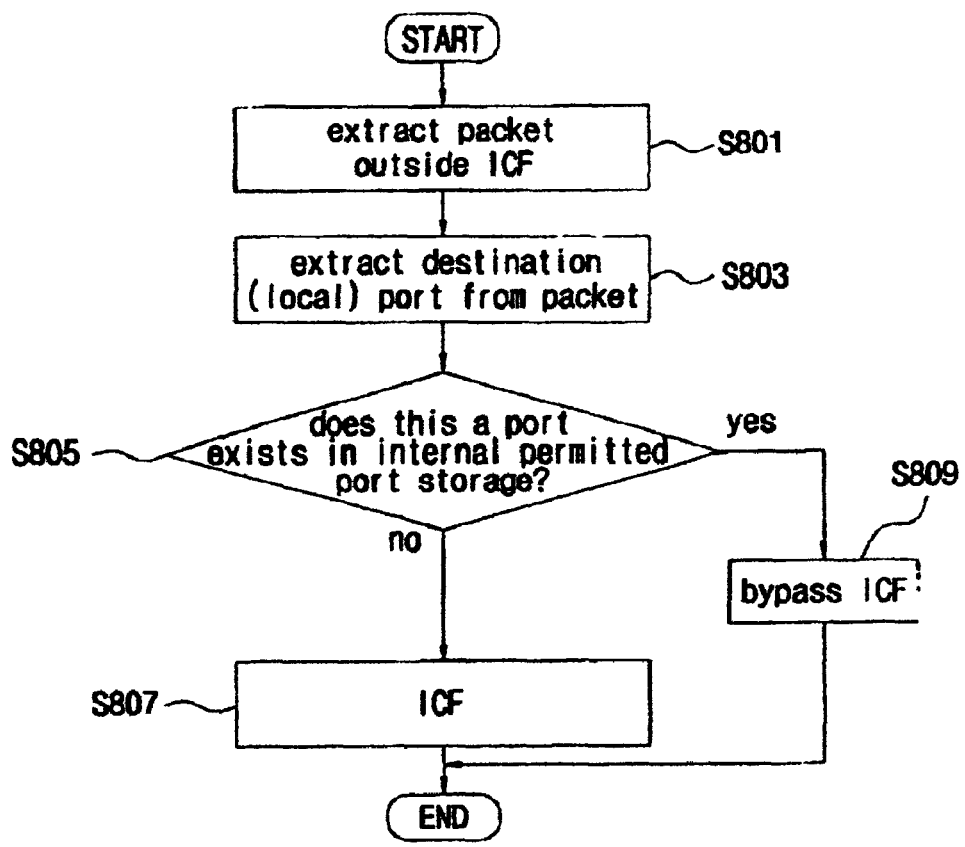
[Fig. 8]

FLEXIBLE NETWORK SECURITY SYSTEM AND METHOD FOR PERMITTING TRUSTED PROCESS

RELATED APPLICATIONS

This is a continuation of U.S. patent application Ser. No. 10/582,127, now U.S. Pat. No. 8,544,078, entitled "FLEXIBLE NETWORK SECURITY SYSTEM AND METHOD FOR PERMITTING TRUSTED PROCESS," filed on Jun. 7, 2006 and issued on Sep. 24, 2013. U.S. patent application Ser. No. 10/582,127 was filed under 35 U.S.C. § 371 as a national stage application of International Patent Appl. No. PCT/KR2004/003456, filed on Dec. 27, 2004, which claims priority to Korean Patent Appl. No. 10-2003-0101775, filed on Dec. 31, 2003.

TECHNICAL FIELD

The present invention relates generally to a flexible network security system and method for permitting a trusted process and, more particularly, to a network security system and method, in which a port, which is used by a program for which communication is permitted, is automatically added to or removed from an internet connection firewall, thus allowing inexpert users to easily use the internet connection firewall having excellent functionality.

BACKGROUND ART

A firewall is a security system that forms a protection border between a network and the outside thereof.

FIG. 1 is a view showing an Internet Connection Firewall (ICF) for protecting a computer and a network, which has been basically provided by Microsoft Inc. since the XP version of Windows.

The ICF is software used to set restrictions on information communicated between a network or small-scale network and the Internet, and protects an Internet connection of a single computer to the Internet.

Meanwhile, a conventional ICF is a stateful firewall. The term stateful firewall refers to a firewall which monitors all the communication passing through a corresponding path, and inspects the original of each message to be processed, a target address and a port.

The ICF permits outbound traffic but blocks inbound traffic, so that a network inside the ICF is not seen from the outside. For this reason, in a Personal Computer (PC) firewall, this function is referred to as a "stealth function."

The operation of the ICF is described in brief below.

The ICF keeps track of traffic originating from an ICF computer, and maintains a communication table, so that unwanted traffic does not enter through the personal connection. Further, all inbound traffic on the Internet is compared with the items in the table. Only in the case where it is proved that a matching item exists in the table and communication originated from the user's computer, inbound Internet traffic is connected to a network computer.

In contrast, in the case where an Internet connection is not permitted on the basis of a firewall permission list, the ICF disconnects the connection. Accordingly, general hacking, such as port scanning, can be blocked by automatically canceling unwanted communication.

For example, when an ICF computer is scanned using a linux nmap scanning tool in order to check such a case, the ICF computer does not respond to any scan operation, so that Network Mapper (Nmap) determines that a target computer does not exist on a network for every scan, and outputs the message "Host Seems Down." As described above, the ICF blocks general hacking, such as port scanning, is performed by automatically canceling unwanted communication.

Meanwhile, when the ICF is installed in a web service providing computer, the ICF blocks inbound traffic, so that the Internet connection is disconnected, and, therefore, normal web service cannot be offered. To solve this problem, the ICF permits inbound traffic to Port 80 used by service, thus being capable of allowing normal web service.

As described above, the ICF allows normal service to be used by adding services and protocols, and the PC firewall also provides such functions.

Meanwhile, the problem of the ICF is described below.

Recent Internet software, such as a web server, a File Transfer Protocol (TCP) server, a telnet server, a peer-to-peer (P2P) program, a remote control program and a messenger program, operates as service providing servers. Furthermore, the amount of software operating as a server as described above is increasing remarkably, and such software trends toward being used by many general users.

However, most users avoid using stealth function of the ICF or PC firewall because the above-described software operating as a server does not operate normally. In Windows XP shown in FIG. 2, the corresponding software can be normally used by adding a port, a protocol, and an Internet Protocol (IP) used by the software operating as a server uses. However, it is difficult for inexpert users to set them because the inexpert users have difficulty in finding a port operating as a server.

Furthermore, since a port operating as a server may be changed when the version of the software is upgraded, normal service may be unexpectedly interrupted. For these reasons, there is a problem in that it is difficult for general users to use the stealth functions of the ICF and the PC firewall despite their desired characteristics.

DISCLOSURE OF INVENTION

Technical Problem

Accordingly, the present invention has been made keeping in mind the above problems occurring in the prior art, and an object of the present invention is to provide a network security system and method, in which a port, which is used by a program for which communication is permitted, is automatically added to or removed from an internet connection firewall, thus allowing inexpert users to easily use a desired function of the internet connection firewall.

Technical Solution

In order to accomplish the above object, the present invention provides a network security system for permitting a trusted process using a firewall, the firewall protecting a corresponding network connection of a computer to a network by setting restrictions on information communicated between networks, including a port monitoring unit for extracting information about a server port being used through a network communication program; an internal permitted program storage for extracting information about a program for which communication is permitted by the firewall, and registering the extracted information; an internal permitted port storage, if the port monitoring unit extracts the information about the server port being used using the program registered in the internal permitted program storage, registering the extracted information about the server port; and a device for making the firewall flexible, determining whether a destination port of a packet of inbound traffic has been registered in the internal permitted port storage, and if the destination port has not been registered, transmitting the corresponding packet to the firewall, and if the destination port has been registered, allowing the corresponding packet to bypass the firewall.

In addition, in order to accomplish the above object, the present invention provides a network security method of permitting a trusted process using a firewall, the firewall protecting a corresponding network connection of a computer to a network by setting restrictions on information communicated between networks, including the first step of extracting information about a server port being used through a network communication program; the second step of extracting information about a program for which communication is permitted by the firewall, and registering the extracted information in an internal permitted program storage; the third step of, if information about the server port being used is extracted using the program registered in the internal permitted program storage at the first step, registering the information about the extracted server port in an internal permitted port storage; the fourth step of determining whether a destination port of a packet of inbound traffic has been registered in the internal permitted port storage; the fifth step of, if, as a result of the determination at the fourth step, the destination port has not been registered, transmitting the packet of inbound traffic to the firewall and the sixth step of, if, as a result of the determination at the fourth step, the destination port has been registered, allowing the corresponding packet to bypass the firewall.

Preferably, in the case of performing communication using Transmission Control Protocol (TCP), the first step is extracts a listen port through hooking when a socket performs listen to operate as a server.

Preferably, in the case of communication using User Datagram Protocol (UDP), the first step extracts the server port by performing hooking in a user mode when a socket-calls a relevant function to receive a packet.

Advantageous Effects

As described above, in accordance with the present invention, a port which is used by a program for which communication is permitted is automatically added to or removed from the ICF, so that inexpert users are capable of easily using the ICF having excellent functionality.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view showing an ICF for protecting a computer and a network, which has basically been provided by Microsoft Inc. since the XP version of Windows;

FIG. 2 is a view showing an interface screen that allows a port, a protocol, and an IP, which are used by software that operates as a server uses in Windows XP, to be added FIG. 3 is a block diagram showing the mode division of a Microsoft Windows operating system used in the present invention FIG. 4 is a schematic flow chart showing the operation of an ICF according to the present invention, which illustrates processes of installing a port monitoring unit and the ICF, and storing a permitted program list in an internal permitted program storage FIG. 5 is a view showing an interface screen that is displayed to allow a communication permitted program list to be stored in an internal permitted program storage in a flexible ICF in accordance with an embodiment of the present invention;

FIG. 6 is a block diagram showing the operation of an entire firewall using a device for making an ICF flexible according to the present invention FIG. 7 is a flowchart showing a process of storing and deleting a server port in and from the internal permitted port storage of a flexible ICF according to an embodiment of the present invention and FIG. 8 is a flowchart showing a packet processing flow performed in front of an ICF in accordance with an embodiment of the present invention.

BEST MODE FOR CARRYING OUT THE INVENTION

A flexible network security system and method for permitting a trusted process and method in accordance with an embodiment of the present invention is described in detail with reference to the accompanying drawings below.

First, the related art corresponding to the background of the present invention is described in brief.

FIG. 3 is a block diagram showing the mode division of a Microsoft Windows operating system used in the present invention.

Referring to FIG. 3, Windows XP, which is provided by Microsoft Inc., provides a kernel mode and a user mode. In the kernel mode, an operating system kernel and various kinds of device drivers are driven, and in the user mode, applications are mainly driven. Programs which operate in the kernel mode exist in the form of device drivers. A kernel mode network structure supported by the Microsoft Windows operating system includes afd.sys (AFD), that is, the kernel of a Windows socket, a Network Driver Interface Specification (NDIS), and a Transport Driver Interface (TDI).

The afd.sys which exists at the uppermost layer in the kernel mode communicates with msafd.dll, that is, a Dynamic link library (DLL) which exists at the lowermost layer in the user mode Windows socket, and constitutes an interface with TDI existing at the lower layer thereof.

The TDI defines a kernel mode interface which exists above a protocol stack. The NDIS provides a standard interface for Network Interface Card Device Drivers (NICDDs).

A method of constructing a firewall in the user mode of the Microsoft Windows operating system is described below in brief.

Hooking refers to a widely known programming method that stores the address of a original function intended to be hooked, and replaces the address of the original function with the address of a function made by the user, thus allowing the original function to be executed afterward through the execution of the function made by the user.

1) Winsock Layered Service Provider (LSP)

This method is a method provided by Microsoft Inc., which is based on a Service Provider Interface (SPI) that is a component existing in Microsoft networking widely used in Quality Of Service (QOS), URL filtering, and the encryption of a data stream.

2) Windows 2000 Packet Filtering Interface

Windows 2000 uses a method of installing a filter descriptor so that an application program in the user mode can perform permission and blocking on the basis of an IP address and port information.

3) Winsock DLL Replacement

This method is based on a method of filtering by replacing the Winsock DLL of Microsoft Windows with a DLL made by the user.

4) Global Function Hooking

This method is based on a method of hooking the socket functions in Windows, such as Connect, listen, Send, Recv, Sendto, and Recvfrom, or a DeviceIoControl( ) function that application in the user mode uses to communicate with a driver in the kernel mode.

A method of constructing a firewall in the kernel mode of the Microsoft Windows operating system is described in brief below.

1) Kernel Mode Socket Filter

This scheme is based on a method of hooking all the Inputs/Outputs (I/Os) in which msafd.dll, which is a DLL existing at the lowermost layer below a Windows socket in the user mode, communicates with afd.sys, which is a kernel mode Windows socket.

2) TDI Filter Driver

This scheme is based on a method of utilizing a filter driver produced by applying an IoAttackDevice( ) API to a device created by a tcpip.sys driver, such as \Device\RawIp, \Device\Udp, \Device\Tcp, \Device\Ip, \Device\MULTICAST. Alternatively, this method is based on a method of hooking all I/Os by replacing a dispatch table existing in the driver object of tcpip.sys.

3) NDIS Intermediate (IM) Driver

This scheme is a method, which is provided to users by Microsoft Inc., and allows a firewall and a Network Address Translation (NAT) to be developed through insertion between a protocol driver, such as TCP/IP, and an MC driver.

4) NDIS Hooking Filter Driver

This scheme is a method of hooking the functions of a NDIS library, which is based on a method of hooking functions, such as NdisRegisterProtocol, NdisDeregisterProtocol, NdisOpenAdapter, NdisCloseAdapter and NdisRegisterProtocol, or a method of hooking the I/Os of a Protocol driver and an MC driver in communication with the NDIS after finding an existing registered protocol driver link on the basis of a returned NdisProtocolHandle, such as TCP/IP, using an NdisRegisterProtocol function that registers the Protocol driver thereof.

The ICF according to the present invention may be implemented in the above-described kernel mode socket filter, TDI filter driver, NDIS IM driver and NDIS hooking filter, and is generally implemented in the NDIS IM driver or NDIS hooking filter driver.

The ICF maintains the entire communication table of IPs and ports by keeping track of traffic originating from an ICF computer. All inbound traffic from the Internet is compared with items existing in this communication table. Only when it is proved that a matching item exists in the table and, therefore, communication originated from the user's computer, inbound Internet traffic is permitted; otherwise the traffic is blocked.

Granting permission to the inbound traffic is performed by calling the address of a hooked original function. In contrast, blocking to the inbound traffic is performed by sending a false return indicating that the call to the original function succeeded or failed without calling the original function, or providing false information so that the original function is called but the performance of the function is not performed normally.

A flexible network security system and method for permitting a trusted process according to the present invention is described based on the above-described basic description related to the firewall.

FIG. 4 is a schematic flowchart showing the operation of an ICF according to the present invention, which illustrates processes of installing a port monitoring unit and the ICF, and storing a permitted program list in an internal permitted program storage.

First, at step S410, a port monitoring unit and an ICF are installed.

In the case of TCP, when a socket performs listen to operate as a server, the port monitoring unit extracts a listen port through Winsock hooking. Furthermore, when a corresponding operation is performed in msafd.dll, a corresponding operation in a kernel is performed in the AFP, that is, the socket part of the kernel, or TDI_EVENT_CONNECT is called through TdiSetEvent( ) in the TDI, the port monitoring unit extracts the listen port.

In the case of User Datagram Protocol (UDP), when a socket calls recvfrom to receive a packet, a server port for receiving the packet is extracted by Winsock hooking in the user mode. Furthermore, when a successive operation in the AFD exists in the kernel mode, or when TDI_EVENT_RECEIVE_DATAGRAM is created through corresponding TdiSetEvent( ), a server port for receiving a packet is extracted.

The port monitoring unit is installed by Winsock hooking in the user mode, or by the kernel mode socket filter and the TDI filter driver in the kernel mode, and functions to extract server port information, protocol information (TCP, UDP, etc.), and OPEN/CLOSE information.

Thereafter, the ICF is installed. Such an ICF may be implemented in a kernel mode socket filter, a TDI filter driver, an NDISIM driver, a Windows 2000 filter hook driver and an NDIS hooking filter driver, and is generally installed through the NDIS IM driver or the NDIS hooking filter driver in the same manner as described above.

Then, at step S420, a permitted program list is stored in an internal permitted program storage. FIG. 5 is a view showing an interface screen that is displayed to allow a communication permitted program list to be stored in an internal permitted program storage in the flexible ICF in accordance with an embodiment of the present invention.

As shown in FIG. 5, when a program to be permitted by the ICF is selected, a program name, the entire path of a program, and, the Message Digest algorithm 5 (MD5) hash value of a corresponding program file for checking, and the integrity of the program are obtained. The program name, the entire path of a program, and the program MD5 hash value obtained as described above are stored in the internal permitted program storage.

The internal permitted program storage stores data in the form of the following Table 1, and in the form of a file or a database including information about the program name, the entire path of a program, and the program MD5 hash value.

TABLE 1

| | Entire path of program | Program MD5 hash value |
| --- | --- | --- |
| 1 | D:\Program Files\MSN Messenger\msnmsgr.exe | 0x8327648276482136868237648 26 37872 |

TABLE 1-continued

| | Entire path of program | Program MD5 hash value |
|---|---|---|
| 2 | D:\Program Files\PcAnywhere.exe | 0x93847293874298379427913928479374 |
| 3 | ... | |

FIG. 6 is a block diagram showing the operation of an entire firewall using a device for making an ICF flexible device according to the present invention, which is described in detail below.

When an Internet use program 610 opens a server port to operate as a server, a device for making an ICF flexible 620 determines whether a program, which opened the corresponding server port, has been registered in an internal permitted program storage 650.

When the corresponding program has been registered, the device for making an ICF flexible 620 registers the opened server port in an internal permitted port storage 660.

Meanwhile, when inbound traffic is transmitted from the outside, the inbound traffic reaches an ICF 630 after passing through a network card 640. The device for making an ICF flexible 620 determines whether a destination port has been registered in the internal permitted port storage 660 by examining the packets of the inbound traffic.

If, as a result of the determination, the corresponding port has not been registered, a packet is transmitted to the ICF 630 and the packet is blocked. However, if the corresponding port has been registered, a packet is not permitted to pass through the ICF 630, and a hooked original function is called to bypass the packet to the device for making an ICF flexible 620 registers.

The following Table 2 is an example showing ports registered in the internal permitted port storage.

TABLE 2

| | Entire path of program | Protocol | Port |
|---|---|---|---|
| 1 | D:\Program Files\MSN Messenger\msnmsgr.exe | TCP | 1863 |
| 2 | D:\Program Files\MSN Messenger\msnmsgr.exe | TCP | 6891 |
| 3 | D:\Program Files\PcAnywhere\PcAnywhere.exe | TCP | 5631 |
| 4 | D:\Program Files\PcAnywhere\PcAnywhere.exe | UDP | 5632 |
| ... | | | |

As shown in Table 2, the internal permitted port storage includes information about the entire path of a program, the protocol and the port, and may exist in the forms of an array or connection list in memory, or in the form of a file or a database.

FIG. 7 is a flowchart showing a process of storing and deleting a server port in and from the internal permitted port storage of a flexible ICF according to an embodiment of the present invention, which is described in detail below.

First, at step S701, information about a server port, OPEN/CLOSE information, and information about protocol are extracted from the port monitoring unit, and then, at step S703, the port monitoring unit determines whether a current program, which opened the server port, has been registered in the internal permitted program storage.

Meanwhile, a method of obtaining information about a current process that is using a network is performed in such a way that the port monitoring unit extracts the ID information of the current process using a PsGetCurrentProcessId( ) function, and acquires the entire path of the current program through the process ID. The MD5 hash value of the corresponding program is extracted through the entire path of the program obtained as described above, and it is determined whether the current program exists in the internal permitted program storage using the MD5 hash value and the entire path of the program.

If, as a result of the determination at step S703, the current program has not been registered, the process ends. In contrast, if the current program has been registered, at step 705, it is determined whether the server port is opened or closed using the extracted OPEN/CLOSE information.

If, as a result of the determination at step S705, the server port has been opened, the information about the entire path of the program, the protocol and the server port is registered at step S709, and the process ends.

In contrast, if, as a result of the determination at step S705, the server port has not been opened, the items of the permitted port storage matched with the information about the entire path of the program, the protocol and the server port are searched for and then deleted at steps S706 and S707, and the process ends.

FIG. 8 is a flowchart showing a packet processing flow performed in front of an ICF in accordance with an embodiment of the present invention, which is described in detail below.

First, at step S801, a packet is extracted from inbound traffic before being processed by the ICF and, then, at step S803, information about a corresponding destination (local) port and a protocol is extracted from the extracted packet.

Thereafter, at step S805, it is determined whether information about a corresponding destination (local) port and a protocol has been registered in the internal permitted port storage.

If, as a result of the determination at step S805, the information has not been registered, the corresponding packet is transmitted to the ICF at step S807. In contrast, if the information has been registered, the destination port must be a permitted port, so that the inbound traffic is allowed to bypass the ICF by calling a hooked original function.

MODE FOR THE INVENTION

Although the preferred embodiments of the present invention have been disclosed for illustrative purposes, it will be apparent to those skilled in the art that various modifications, additions and substitutions thereof are possible, without departing from the spirit of the invention. Accordingly, the scope of the invention will be limited only by the accompanying claims, in which it will be appreciated that the examples of the modifications, additions and substitutions are all included.

INDUSTRIAL APPLICABILITY

As described above, in accordance with the present invention, a port which is used by a program for which communication is permitted is automatically added to or removed from the ICF, so that inexpert users are capable of easily using the ICF having excellent functionality.

What is claimed is:
1. A computer executing a firewall controlling inbound traffic, the firewall protecting the computer against a net- work connection attempt by setting restrictions on information communicated between networks, the computer comprising:

an internal permitted program storage configured to store a list of programs permitted by the firewall;

an input interface configured to accept an indication that one or more permitted network communication programs are permitted by the firewall, thereby resulting in said one or more permitted network communication programs being added to the list of programs permitted by the firewall in the internal permitted program storage;

a port monitoring unit configured to automatically extract, outside of the firewall, information about a protocol using a server port, wherein the server port is designated as a port of a network communication program providing one or more packets of inbound traffic for a destination port; and a flexible firewall device making the firewall flexible, the flexible firewall device configured to populate a list of server ports permitted by the firewall in an internal permitted port storage as follows:

detect that said network communication program tries to listen to said server port;

in response to detecting that said network communication program tries to listen to said server port, extract, outside of the firewall, using the port monitoring unit, information about the server port requesting communication with the destination port of the packets of inbound traffic; and automatically store the extracted information about the server port in the internal permitted port storage if said network communication program matches a program on said list of programs permitted by the firewall in the internal permitted program storage;

wherein the flexible firewall device is further configured to thereafter selectively block or allow one or more packets of inbound traffic to the computer as follows:

make a determination whether a destination port of the one or more packets of inbound traffic matches one of the server ports included in the list of server ports permitted by the firewall in the internal permitted port storage;

either allow or block the one or more packets of inbound traffic based on the determination whether the destination port of the one or more packets of inbound traffic matches one of the server ports included in the list of server ports permitted by the firewall in the internal permitted port storage, and using the information about the server port and the protocol to determine whether registration exists in the internal permitted port storage; and in the case of a determination that the registration does not exist, transmitting the corresponding packet to the firewall, and in the case of a determination that the registration exists, bypassing the firewall, as a transmission to a permitted port as a hooked original function.

2. The computer as set forth in claim 1, wherein the flexible firewall device is further configured to delete information about a server port from the internal permitted port storage without intervention by the user of the computer if the permitted network communication program closes the server port.

3. The computer as set forth in claim 1, wherein the flexible firewall device is further configured to store information about a server port without intervention by the user of the computer if the permitted network communication program opens the server port.

4. The computer as set forth in claim 1, wherein the list of programs permitted by the firewall in the internal permitted program storage includes information about at least one of a program name, an entire path of the program, and a program hash value.

5. The computer as set forth in claim 1, wherein the flexible firewall device is further configured to inspect the packets of inbound traffic in a kernel mode.

6. The computer as set forth in claim 1, wherein a packet of inbound traffic includes a protocol she protocol, a source IP address, a source port, a destination IP address, and a destination port.

7. The computer as set forth in claim 1, wherein the flexible firewall device is configured to populate the list of server ports permitted by the firewall without intervention by the user of the computer.

8. The computer as set forth in claim 1, wherein the flexible firewall device is configured to populate the list of server ports permitted by the firewall by repeating the detecting, extracting, and automatically storing steps as necessary to populate the list of server ports permitted by the firewall in the internal permitted port storage.

9. The computer as set forth in claim 1, wherein the determination of whether a destination port of inbound traffic matches one of the server ports included in the list of server ports permitted by the firewall in the internal permitted port storage comprises:

for inbound traffic transmitted from the outside, the inbound traffic reaches the firewall device after passing through the network connection, the firewall device determines whether a registration exists for the destination port in the internal permitted port storage by examining the packets of the inbound traffic.

10. The computer as set forth in claim 1, wherein the determination of whether a destination port of inbound traffic matches one of the server ports included in the list of server ports permitted by the firewall in the internal permitted port storage comprises:

extracting a packet from inbound traffic before processing by the firewall; and extracting, from the extracted packet, information about a corresponding destination port and extracting the information about the protocol.

11. A computer security method for controlling inbound traffic of a computer executing a firewall, the firewall protecting the computer against a network connection attempt by setting restrictions on information communicated between networks, the method comprising:

storing in an internal permitted program storage a list of programs permitted by the firewall;

adding a network communication program to the list of programs stored in the internal permitted program storage;

automatically extracting, outside of the firewall, information about a protocol using a server port, wherein the server port is designated as a port of the network communication program;

automatically storing, by the firewall, the extracted information about the server port in an internal permitted port storage in response to determining that the network communication program tries to listen to the server port;

using the information about the server port and the protocol to determine whether registration exists in the internal permitted port storage; and in the case of a determination that the registration does not exist, transmitting the corresponding packet to the firewall, and in the case of a determination that the registration exists, bypassing the firewall, as a transmission to a permitted port as a hooked original function.

12. The method as set forth in claim 11, further comprising:
deleting the extracted information about the server port from the internal permitted port storage without intervention by the user of the computer if the added network communication program closes the server port.

13. The method as set forth in claim 11, further comprising:
blocking the packet of inbound traffic in response to determining that the port does not match the server port.

14. The method as set forth in claim 11, further comprising:
storing the extracted information about the server port in the internal permitted port storage without intervention by a user of the computer if the added network communication program opens the server port.

15. The method as set forth in claim 11, wherein the information about the network communication program includes information about at least one of a program name, an entire path of the program, and a program hash value.

16. The method as set forth in claim 11, wherein the firewall inspects the packet of inbound traffic in a kernel mode.

17. The method as set forth in claim 11, wherein a packet of inbound traffic includes the protocol, a source IP address, a source port, a destination IP address, and a destination port.

18. The method as set forth in claim 11, wherein extracting information about a server port and automatically storing the extracted information about the server port in an internal permitted port storage comprises:
detecting that the added network communication program tries to listen to a server port;
in response to detecting that the network communication program tries to listen to a server port, extracting, outside of the firewall, information about the server port; and
automatically storing the extracted information about the server port in the internal permitted port storage.

19. The method as set forth in claim 11, wherein extracting, without intervention by a user of the computer, information about a server port comprises extracting, without intervention by the user of the computer, information about the server port, with the server port designated as providing one or more packets of inbound traffic for a destination port.

20. The method as set forth in claim 11, wherein the determination of whether a destination port of inbound traffic matches one of the server ports included in the list of server ports permitted by the firewall in the internal permitted port storage comprises:
for inbound traffic transmitted from the outside, the inbound traffic reaches the firewall device after passing through the network connection, the firewall device determines whether a registration exists for the destination port in the internal permitted port storage by examining the packets of the inbound traffic.

21. The method as set forth in claim 11, wherein the determination of whether a destination port of inbound traffic matches one of the server ports included in the list of server ports permitted by the firewall in the internal permitted port storage comprises:
extracting a packet from inbound traffic before processing by the firewall; and
extracting, from the extracted packet, information about a corresponding destination port and extracting the information about the protocol.

\* \* \* \* \*